Oct. 5, 1965  H. A. BOURNE, JR., ETAL  3,209,835
INFLATABLE PACKER APPARATUS

Original Filed March 18, 1957  3 Sheets-Sheet 1

INVENTORS
HENRY A. BOURNE, JR.
PRESTON L. GANT
BY

*Jerome B. Peterson*

ATTORNEY

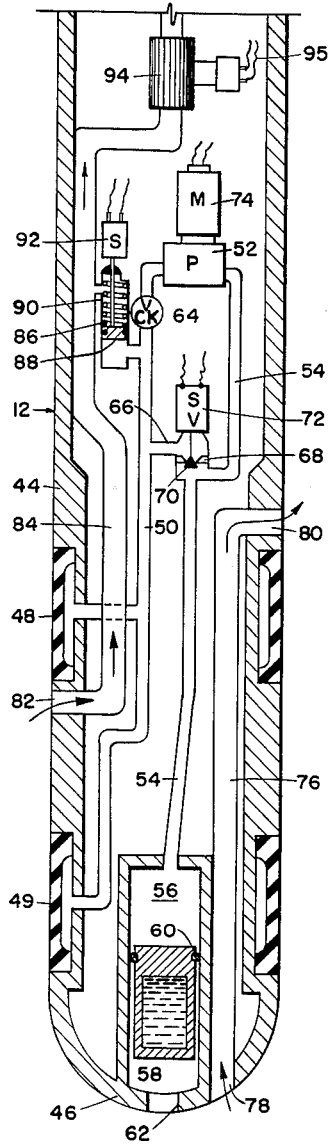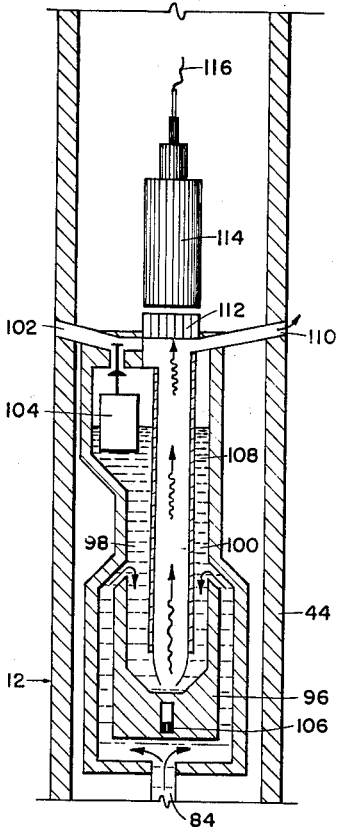
FIG. 3
FIG. 4

Oct. 5, 1965   H. A. BOURNE, JR., ETAL   3,209,835
INFLATABLE PACKER APPARATUS
Original Filed March 18, 1957   3 Sheets-Sheet 3

INVENTORS
HENRY A BOURNE, JR
PRESTON L. GANT
BY
Jerome B. Peterson
ATTORNEY

# United States Patent Office 3,209,835
Patented Oct. 5, 1965

3,209,835
INFLATABLE PACKER APPARATUS
Henry A. Bourne, Jr., and Preston L. Gant, Ponca City, Okla., assignors to Continental Oil Company, Ponca City, Okla., a corporation of Delaware
Original application Mar. 18, 1957, Ser. No. 646,601. Divided and this application Aug. 2, 1963, Ser. No. 299,544
4 Claims. (Cl. 166—187)

This in a divisional application of Serial No. 646,601, filed March 18, 1957, now Patent Number 3,103,812, entitled "Fluid Analyzing Tool."

This invention relates generally to improvements in testing equipment for oil wells, and more particularly, but not by way of limitation, to an inflatable packer system for isolating zones of an oil well prior to testing the fluids produced from such zones.

Most producing oil wells are characterized at some time in their productive life by the influx of water into the well bore. Usually, water production begins at low rates and increases with time; in many cases finally amounting to 95–98% of the total fluid production of the well. In flowing wells, substantial increases in water influx result in lower flowing rates or cessation of natural flow. Cessation of flow results because the average density of the produced fluid is increased, and the available energy (from produced gas) must be used in lifting water as well as oil. When the water-oil ratio increases to a point where the available gas energy is insufficient to lift both oil and water, flow ceases.

In wells being produced by artificial lifting means, increases in produced water-oil ratios require increases in lifting equipment volumetric capacity, if oil production rates are to be maintained. In addition, lifting energy requirements are increased to lift the unwanted water. In many areas, the disposal of unwanted produced water, which is usually saline, is an additional expense. It is apparent that if water-oil ratios of the produced fluid can be reduced without reduction in oil production, then oil can be produced at less cost.

Where water has been produced in oil wells, there is much evidence that it often enters the well bore through the lower portions of the productive interval. The productive interval may be in the form of an "open hole" (a well bore not cased) or may be behind perforated casing; and the productive intervals may range from a few feet to several hundred feet in thickness. Knowledge of the specific depth intervals of water entry, and the entry rates, will permit the accurate placement of plugs, either cement or other material, to shut off at least the major zones of water entry. Accurate information on intervals of water entry and entry rates can be obtained only when normal bottom hole producing conditions prevail. In flowing wells, these conditions are obtained while the well is flowing. In non-flowing wells, these conditions are obtained when pumping operations or other lifting methods are in use.

The most commonly used method of determining the zones of water influx into an oil well is what is commonly known as a "Drill stem test." This test is ordinarily used immediately after a well is drilled, and involves the use of substantially the complete drill string. Spaced packers are placed on the drill string to engage the walls of the well bore and isolate a limited portion of the well bore. Formation fluids entering the isolated section are vented through the drill string, and then the composition of these fluids is determined at the surface of the well. It will be apparent that the normal pressures in the well under producing conditions are not obtained during such a test. Also, the test involves an extensive amount of manipulations of the drill string, the flow periods are usually short, and the entire operation is very costly. In addition, and as indicated above, a drill stem test is ordinarily run only immediately following the drilling of the well. This, of course, gives no indication of the zones of water influx which will occur after the well has been producing for a relatively short period of time.

The present invention contemplates a novel packer system for use in an analyzing tool which will effectively determine the zones of water influx. In using the apparatus, a selected portion of a well bore may be isolated from the remainder of the well bore in such a manner that the normal operating pressures, and particularly the normal back pressure on the isolated portion, are retained the same as under normal operating conditions. The fluid produced from the isolated portion may be measured for total flow and for its oil-water ratio, whereby the total amount of water being produced from the isolated portion of the well bore may be determined. The tool may be moved through the well bore, whereby the entire producing interval or intervals may be logged.

An important object of this invention is to provide information for increasing the efficiency of producing oil wells.

Another object of this invention is to provide means for increasing the oil-water ratio of fluids produced from an oil well.

A further, and more specific, object of this invention, is to provide means for precisely determining the zones of water influx in a producing well, as well as the rates of water influx in a producing oil well.

Another object of this invention is to determine the zones of water influx into a producing oil well under normal operating conditions.

Another object of this invention is to provide a tool for locating the water producing zones in an oil well, wherein the entire producing interval or intervals may be logged by one passage of the tool through the well bore.

A still further object of this invention is to provide an apparatus for locating the zones of water influx in a producing oil well, which apparatus is simple in construction and may be economically manufactured.

Other objects and advantages of the invention will be evident from the following detailed description, when read in conjunction with the accompanying drawings which illustrate our invention.

In the drawings:

FIGURE 3 is a schematic vertical sectional view through the lower portion of our analyzing tool.

FIGURE 4 is a schematic vertical sectional view through the central portion of our tool, and is a continuation from the upper end of FIGURE 3.

Figure 1:
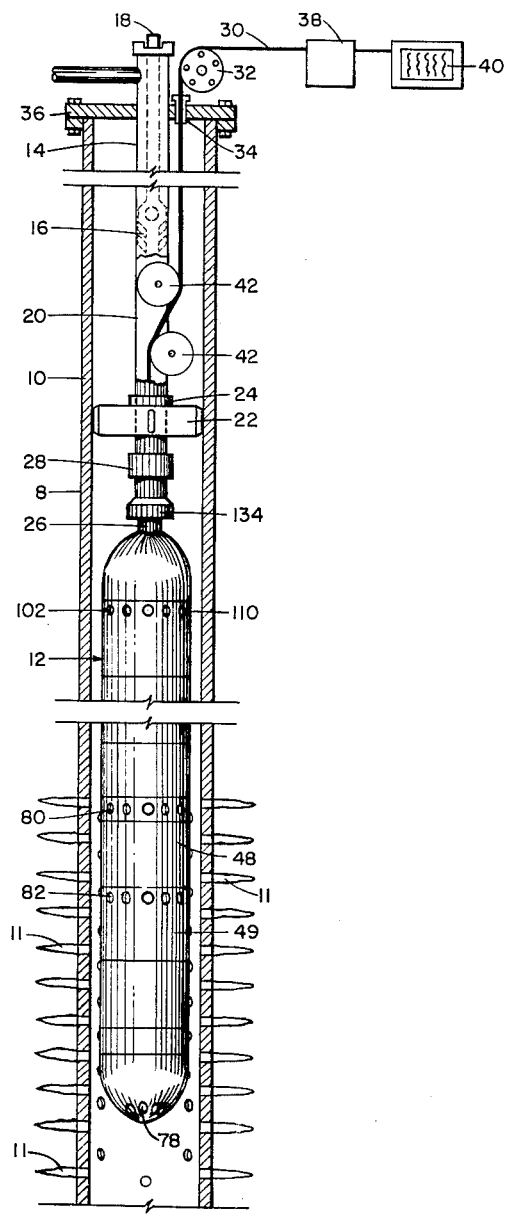
FIGURE 1 is a vertical sectional view through an oil well schematically illustrating apparatus constructed according to our invention, and one combination of apparatus which may be used to run our novel analyzing tool in a well.

Referring to the drawings in detail, and particularly FIGURE 1, reference character 8 designates a typical well bore having a casing 10 secured therein, with the lower portion of the casing 10 being perforated at 11 to expose the producing intervals of the well bore 8.

It will be understood that the casing 10 is for illustration only, and that the present invention may be utilized in wells which are completed open hole, as well as in cased wells.

An analyzing tool, generally designated by reference character 12, is preferably run into the casing 10 on the lower end of the usual production tubing 14. The tubing 14 contains the usual bottom hole pump 16 and upwardly extending sucker rods 18 for operation of the pump. It will be understood that any lifting means may be used in the tubing 14. In flowing wells, the tubing 14 may be simply open for the passage of fluids upwardly therethrough. A latching member 20 is secured on the lower end of the tubing 14 below the pump 16 to support the analyzing tool 12, as the tool 12 is being run in and out of the casing 10.

The latching device 20 preferably comprises a spring-loaded pad or ring 22 slidingly disposed on the latching device 20 and having an outer diameter sufficient to engage the casing 10 with sufficient force to hold the ring 22 in a given position in the casing unless substantial force is applied to the top or bottom of the ring. A fixed collar 24 on the device 20 above the ring 22 retains the ring 22 in position during the running of the entire apparatus into the well. The lower portion of the latching device 20 is tubular to receive a reduced diameter extension 26 on the upper end of the tool 12. A latching collar 28 is located on the latching device 20 below the ring 22 to engage the extension 26 (when the collar 28 is in an upper position) and hold the tool 12 in the latching device 20 by four balls (not shown) in shear for lowering the apparatus into a well. The detailed construction of the collar 28 forms no part of the present invention and is therefore not disclosed in detail herein. It is believed sufficient to say that when the tubing 14 is raised, collar 28 contacts the ring 22, whereby the collar 28 is moved downwardly relative to the latching device 20 and the extension 26 is released. Several types of ball or friction retaining devices are available in the industry and any suitable type may be used.

An electric, multi-conductor, armored cable 30 extends from the surface of the well down through the casing 10 to the upper end (see FIG. 2) of the tool 12. These cables are well-known in the art of well logging and are of sufficient strength to support the tool 12 when the tool 12 is released from the production tubing 14, as well as conduct electric signals to and from the tool. If desired, the cable 30 may be run over a suitable measuring reel 32 at the surface to determine the precise depth of the tool 12 at all times. In addition, the cable 30 may be run through a suitable lubricator 34 at the well head 36 to prevent leakage past the cable 30, if operating pressures in the casing 10 so require.

The upper end of the cable 30 is connected to one or more amplifiers 38, and a multiple pen recorder 40 for amplifying and recording signals sent upwardly through the cable 30, as will be more fully hereinafter set forth. Also, a suitable power source, (not shown) is connected to the upper portion of the cable 30 to energize certain equipment in the analyzing tool 12. It will be observed that the cable 30 extends from a position outside of the tubing 14 to the central top portion of the analyzing tool 12. To bend the cable 30 and center the cable with the upper end of the analyzing tool 12, we prefer to use two appropriately spaced pulleys or sheaves 42 rotatably secured in the latching device 20. The cable 30 may then be run between the pulleys 42 in the manner shown to facilitate a substantially unrestricted vertical movement of the cable 30 during raising and lowering of the analyzing tool 12.

Figure 5:
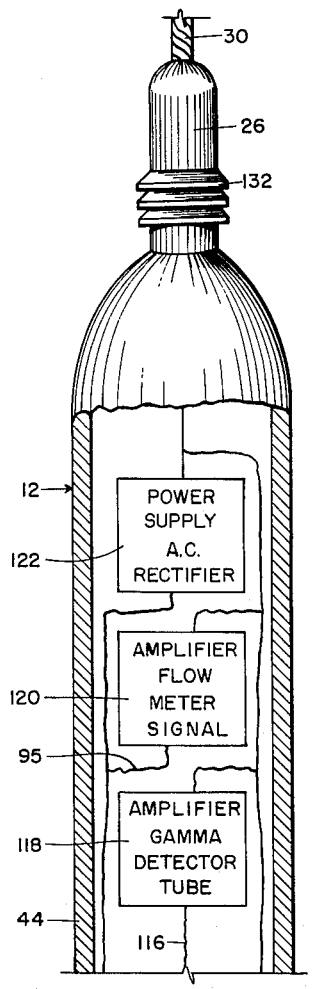
FIGURE 5 is a continuation from the upper end of FIGURE 4, and is a schematic vertical sectional view of the upper portion of the tool.

As shown in FIGURES 3, 4 and 5, the analyzing tool 12 includes an elongated tubular shaped housing 44 rounded and closed (FIG. 3) at its lower end 46. A pair of inflatable packers 48 and 49 are secured on the outer periphery of the housing 44 in vertically spaced relation near the lower end 46 of the housing. The packers 48 and 49 are of a size to be expanded outwardly and engage the inner periphery of the well casing 10, or the walls of a well bore completed open hole, as will be more fully hereinafter set forth. Fluid is forced under pressure into the packers 48 and 49 through a conduit or passageway 50 extending from the discharge side of a suitable pump 52 secured in the housing 44. The inlet of the pump 52 is connected by a conduit or passageway 54 to a reservoir 56 provided in the lower portion of the housing 44. The reservoir 56 is provided to contain an adequate supply of hydraulic fluid above a weighted piston 58 which is slidingly sealed in the reservoir 56 by a suitable sealing ring 60. The weighted piston 58 is filled with a heavy liquid, such as mercury, whereby the piston constantly tends to move downwardly in the reservoir 56. It will be understood, of course, that the piston 58 may be weighted in any desired manner in order to have a tendency to move away from the conduit 54. The lower end of the reservoir 56, below the piston 58, is vented to well bore pressure through a suitable port 62.

The pump 52 operates in the usual manner to draw hydraulic fluid from the reservoir 56 upwardly through the conduit 54 and to discharge this hydraulic fluid through the conduit 50 to the packers 48 and 49. A suitable check valve 64 is preferably interposed in the conduit 50 near the discharge of the pump 52 to prevent any possible retrograde flow of fluid through the pump. Also, a by-pass conduit 66 interconnects the conduits 50 and 54, with the by-pass 66 being connected to the conduit 50 downstream of the check valve 64. A valve seat 68 is formed in an enlarged portion of the by-pass 66 and receives a valve 70 which operates to close the by-pass 66. The valve 70 is operated by a solenoid 72 in such a manner to retain the valve 70 closed on the valve seat 68 when power is supplied to the driving motor 74 of the pump 52, and to open the valve 70 when power to the motor 74 is cut off, as will be more fully hereinafter set forth.

A by-pass passageway or conduit 76 extends from ports 78 in the housing 44 below the lower packer 49 to ports 80 above the upper packer 48. The passageway 76 is provided to conduct fluids being produced below the lower packer 49 to the portion of the well bore above the upper packer 48, whereby the normal back pressure on the formations below the tool 12 will be maintained during use of the tool.

Another set of ports 82 are provided in the housing 44 between the packers 48 and 49 to receive fluid produced between the packers when the packers are expanded into engagement with the well casing 10, as will be more fully hereinafter set forth. The ports 82 communicate with a vertically extending passageway or conduit 84 which conducts the fluids under test through the housing 44 separate from the fluids produced below the lower packer 49. A cylinder 86 communicates with the passageway 84 and the conduit 50, with the lower end of the cylinder 86 being connected to the conduit 50 downstream of the check valve 64. A piston 88 is reciprocally disposed in the cylinder 86 and is biased toward the end of the cylinder 86 communicating with the conduit 50 by a helical spring 90. The piston 88 is provided to operate a switch 92 which is interconnected with the power circuit for the motor 74, as will be explained in detail below.

A suitable meter 94 is interposed in the test fluid conduit 84 to measure the flow rate of fluids flowing through the conduit 84. The meter 94 may be of any suitable type which has sufficient capacity for metering the expected flow rate. Suitable leads 95 extend from the meter 94 through the cable 30 to the surface for sending signals from the meter to the recorder 40 (FIG. 1) at the surface, whereby the flow rate of fluid flowing through conduit 84 may be continuously recorded.

The upper portion of the passageway 84, above the meter 94, is divided as shown in FIG. 4 to extend upwardly around an intermediate plug member 96 in the housing 44. At the upper end of the plug 96, the passageway 84 turns inwardly and intersects a vertically extending passageway 98 to provide a sharp change in the direction of flow of fluids flowing through the passageway 84. The lower end of the passageway 98 communicates with a vertically extending tube 100, and the upper end of the passageway 98 communicates with gas discharge ports 102 extending transversely through the wall of the housing 44. A suitable gas float valve 104 is slidingly secured in the upper portion of the vertical passageway 98 to close off the upper end of the passageway 98 from the ports 102 when the liquid level in the passageway 98 reaches a predetermined level. The float valve 104 operates in the usual manner to prevent the discharge of liquid and provide a discharge of gas from the upper end of the passageway 98 when a sufficient quantity of gas has collected in the upper end of this passageway.

The tube 100 may be considered the analyzing tube where the oil-water ratio of the fluids flowing through the tool 12 is determined. A suitable gamma-ray or X-ray emitter 106 is secured in the plug 96 directly below the analyzing tube 100 to provide a transmission of electro-magnetic waves upwardly through the tube 100, as well as through the fluids flowing through the tube 100. The source 106 may be any suitable emitter which will generate the desired intensity of gamma or X-rays. Examples of gamma ray sources which could be used are radium, Ce-144 and Cs-137. It is understood that other isotopes may be used. Beta ray emitting isotopes which produce X-rays or bremmstrahlung radiation may also be used. An example of this type of radiation is that produced by Strontium 90 emitted beta rays impinging on a lead target, thus producing lead X-rays. Also, it is preferred that the analyzing tube 100 be surrounded by a lead shield 108 to minimize transmission of electro-magnetic waves into passageway 98, thus reducing back-scattered radiation into the detector, which will be hereinafter described.

The upper end of the tube 100 communicates with a plurality of discharge ports 110 for discharging the measured and analyzed fluids to the casing 10, where the tested fluids may be co-mingled and produced with the remaining fluids produced in the well. A window 112 is suitably sealed in the upper end of the tube 100 above the discharge ports 110 to provide a transmission of the electro-magnetic waves on upwardly to a suitable detector tube 114. The detector tube 114 may be either a scintillation counter or a Geiger counter, and is secured in the housing 44 directly in line with the emitter 106 to measure the intensity of radiation passing through the fluids present in the tube 100. As it is well-known, the density of materials affects the transmission of electro-magnetic radiation, and water is more dense than oil. Therefore, with a fixed source strength of the emitter 106, and a fixed distance between the emitter 106 and the tube 114, the variation in density of the fluids flowing through the tube 100 may be readily measured. It will also be apparent that the detector tube 114 and recorder 40 may be calibrated in such a manner to provide a direct measurement of the oil-water ratio of the fluids flowing through the tube 100. The count of the tube 114 is transmitted upwardly through conductors 116 (which extend through the armored cable 30) to the recorder 40, whereby the count of the tube 114 may be recorded simultaneously with the flow rate determined by the meter 94. The combination of these two measurements will provide sufficient data for determining the specific amount of water or oil being produced and forced through the conduit 84 at any specific subsurface location of the analyzing tool 12.

As shown in FIG. 5, an amplifier 118 for the detector tube 114, and an amplifier 120 for the flow meter 94 are secured in the housing 44 above the detector tube 114. The amplifiers 118 and 120 function to amplify the signals from the tube 114 and the meter 94, respectively, prior to transmission of these signals upwardly through the armored cable 30 to the surface of the well. The signals are further amplified by the amplifier 38 (FIG. 1) prior to feeding of the signals to the recorder 40. In the event the power supply at the surface is alternating current, a rectifier 122 (FIG. 5) may also be secured in the housing 44 adjacent the amplifiers 118 and 120 to convert the power supply to direct current for use by the motor 74 and solenoid 72.

Figure 6:
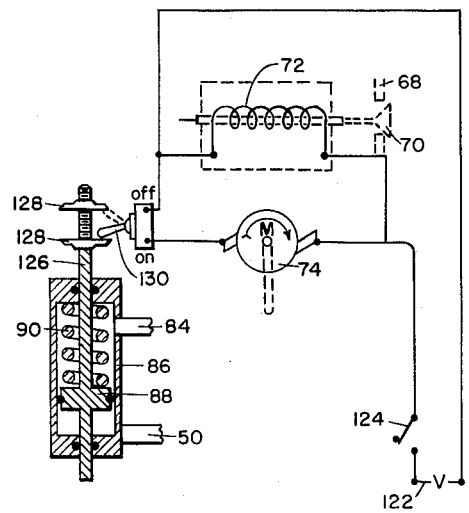
FIGURE 6 is a wiring diagram and a structural detail of a portion of the controls for the packers of our analyzing tool.

As shown in FIG. 6, the motor 74 and switch 92 are connected in series with the power supply 122, or the power supply from the surface. A suitable on-off switch 124 (located at the surface of the well 8) is interposed in the lead from the power supply 122 to the motor 74, and the solenoid 72 is shunted around the motor 74 and the switch 92. As also shown in FIG. 6, the piston rod 126 of the spring-loaded piston 88 is provided with two spaced lugs 128. The lugs 128 are provided to operate the switch arm 130 of the switch 92 upon a change in position of the piston 88.

*Operation*

When it is desired to determine the zones of water influx in the well bore 8, the analyzing tool 12 is attached to the latching device 20 by means of the collar 28 as shown in FIG. 1 and as previously described. The cable 30 is run between the pulleys 42, and the latching device 20 is in turn secured to the lower end of the tubing string 14. The tubing string 14 is then run in the casing 10 in the usual manner, with the cable 30 being lowered simultaneously over the measuring reel 32 and through the lubricator 34.

When the tubing string 14 has been lowered to the desired pumping position, the tubing 14 is raised a short distance to move the latching device 20 upwardly through the friction ring 22. When the collar 28 is engaged by the ring 22, the analyzing tool 12 will be released and will be suspended on the lower end of the cable 30 in the manner shown in FIG. 2. The pump 16 is then placed in operation to produce the well 8 in the usual manner, whereby formation fluids from the production interval are forced upwardly through the tubing 14. After producing conditions are stabilized, the cable 30 is lengthened or lowered in the well bore 8 to lower the analyzing tool 12 so that packers 48 and 49 straddle the producing interval to be tested.

Figure 2:
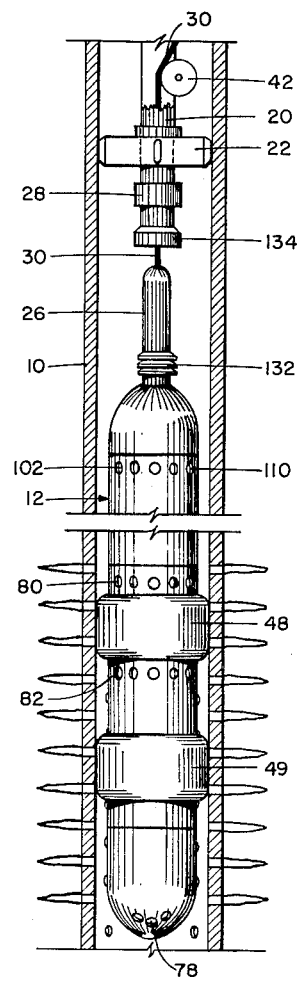
FIGURE 2 is a view similar to FIGURE 1 illustrating use of our novel tool.

With the tool 12 in its lowermost position, the switch 124 (FIG. 6) is closed to provide a supply of electric current to the motor 74. It will be assumed that the piston 88 is in such a position that the switch 92 will be closed at this time to provide a flow of current through the motor 74 as well as the solenoid 72. Energizing of the solenoid 72 closes the valve 70 in the by-pass conduit 66 (FIG. 3), and energizing of the motor 74 places the pump 52 in operation. Therefore, hydraulic fluid will be pumped from the reservoir 56 through the conduits 54 and 50 to inflate the packers 48 and 49. This pumping operation is continued until the packers 48 and 49 engage the inner periphery of the casing 10, as shown in FIG. 2, and until the pressure of the fluid in the conduit 50 exceeds the pressure in conduit 84 by a pre-determined amount.

When the force exerted on the piston 88 by the pressure in the conduit 50 exceeds the force exerted by the pressure of the fluid in the conduit 84 (see FIG. 6) plus the force exerted by the spring 90, the piston 88 is raised in the cylinder 86 to bring the lower lug 128 into engagement with the switch arm 130 and open the switch 92. The motor 74 will then be de-energized to stop the pump 52. However, current continues to flow through the solenoid 72 to retain the by-pass valve 70 in a closed condition. Also, the check valve 64 (FIG. 3) prevents a reverse flow of hydraulic fluid through the pump 52. Therefore, pressure is maintained on the packers 48 and 49 to prevent a flow of fluid either upwardly or downwardly along the casing 10 past the packers.

Fluid then being produced from below the lower packer 49 will be directed upwardly through the by-pass passageway 76, through ports 80 and will be discharged above the upper packer 48, and thence to the pump 16. Fluid being produced between the packers 48 and 49 will flow through the ports 82 and conduit 84 to the meter 94. As previously described, the meter 94 provides a measurement of the flow rate through the conduit 84, and hence the flow rate of fluid being produced in the zone of the well bore 8 between the packers 48 and 49.

The measured fluid then flows on upwardly into the vertical passageway 98 (FIG. 4) where the direction of fluid flow is drastically changed. This change in direction induces a separation of the free gaseous components of the fluids under test, whereby the gas will tend to rise in the passageway 98 and flow outwardly through the discharge ports 102; whereas the liquid components of the fluids under test will tend to flow downwardly into the lower end of the analyzing tube 100. The fluids under test (which will consist principally of oil and water) will then flow upwardly through the tube 100 and be subjected to radiation from the emitter 106, whereby the detector 114 will measure the attenuation of radiation caused by the fluids, and hence the oil-water ratio of the fluids. The fluids tested by the detector 114 are discharged through the ports 110 to co-mingle and be produced with the remaining fluids being produced from the well bore 8.

During use of the tool 12 to measure and analyze the fluids produced between the packers 48 and 49, it is to be especially noted that the normal operating or producing conditions are maintained. Fluid being produced below the lower packer 49 flows freely through the by-pass 76 to the pump 16, and, of course, fluids being produced above the upper packer 48 flow directly to the pump 16. The passageways 84 and 98, as well as the analyzing tube 100 are sufficiently large that no appreciable pressure drop occurs when fluid being produced between the packers flows therethrough. Also, the meter 94 should be of a type which will not appreciably obstruct the flow of fluid therethrough. Therefore, the back pressures on all producing zones will be substantially the same as under normal producing conditions.

When the analyzing tool 12 has been in its lower position a sufficient length of time to provide a determination of the oil-water ratio of fluids produced in the zone between the packers 48 and 49 and the rate of this fluid flow, the switch 124 (FIG. 6) is opened. Thus, the solenoid 72 is de-energized to provide an opening of the valve 70 and the by-pass 66 (FIG. 3). The hydraulic fluid in the packers 48 and 49 will then flow upwardly through the conduit 50, the by-pass 66, and then downwardly through the passageway 54 into the upper end of the reservoir 56. When the valve 70 is opened, the weighted piston 58 is exposed to packer pressure on one side, and well bore pressure on the opposite side (through the port 62) thereby providing a differential pressure on the packers 48 and 49 in a direction tending to deflate the packers. For example, the weight of the piston 58 may be sufficient to provide a differential pressure of three pounds per square inch. Thus, when the valve 70 is opened, the pressure on the outside of the packers 48 and 49 will immediately exceed the pressure on the inside of the packers by three pounds per square inch to provide a rapid deflation of the packers.

The cable 30 is then raised to raise the analyzing tool 12 to an adjacent upper position. When logging an entire producing interval, the analyzing tool 12 is preferably raised a distance substantially corresponding to the distance between the packers 48 and 49. Thus, the next zone to be tested will be immediately above the first zone tested, and the entire producing interval may thus be subjected to the analyzing tool 12.

With the tool 12 in its new position, the switch 124 (FIG. 6) is again closed to energize the motor 74 and the solenoid 72. The pressure in the conduit 50 will be substantially equal to the pressure in the conduit 84 when the packers 48 and 49 are deflated. Therefore, the spring 90 lowers the piston 88 in the cylinder 86 to again close the switch 92 and complete the circuit through the motor 74. The operation of inflating the packers 48 and 49 and analyzing the fluid produced in the zone between the packers is repeated in the same manner as previously described. Furthermore, this operation is repeated for each zone of the producing interval in the well bore 8.

When the complete producing interval has been logged, the cable 30 is raised to move the extension 26 of the analyzing tool 12 into the lower end portion of the latching device 20. A series of threads 132 (FIG. 2) on the extension 26 are raised into engagement with an expandable and internally threaded portion 134 of the latching device 20 to secure the analyzing tool 12 in the latching device 20 against downward movement of the analyzing tool. The tubing 14 is then pulled from the casing 10 in the usual manner to remove the analyzing tool 12 from the well. Simultaneously, of course, the cable 30 is raised through the lubricator 34 and retrieved at the surface of the well.

The circuit arrangement and combination shown in FIG. 6 not only provides a normal inflation and deflation of the packers 48 and 49, but also prevents an accidental or inadvertent deflation of the packers during an analyzing test. Although the check valve 64 (FIG. 3) should prevent deflation of the packers 48 and 49 when the by-pass valve 70 is closed, some leaks may occur in the hydraulic system. In the event the pressure applied to the packers 48 and 49 is reduced below a pre-determined minimum, the force exerted on the piston 88 (FIG. 6) by the pressure of the fluid in the passageway 84, plus the force imposed by the spring 90, will overcome the force imposed on the piston 88 by the pressure in the passageway 50; whereupon the piston 88 will be lowered in the cylinder 86 to close the switch 92 and again energize the motor 74. With the motor 74 running, hydraulic fluid is again forced into the packers 48 and 49, and such operation is continued until a pre-determined maximum pressure is applied. At this pressure, the force exerted by the pressure in the conduit 50 exceeds the force exerted by the pressure in the conduit 84, plus the action of the spring 90, to again raise the piston 88 and open the switch 92. Thus, the internal pressure of the packers 48 and 49 may be controlled between pre-determined maximum and minimum limits to assure engagement of the packers with the casing 10, and without overinflating the packers. The tension of the spring 90 may be selected as desired to control the pressure difference between the desired maximum and minimum pressures.

From the foregoing it will be apparent that with the use of the present invention, the zones of water influx in a producing oil well may be precisely determined. The normal operating conditions in the well are maintained during analysis of the fluid produced from pre-determined zones in the well, whereby the normal water influx will be determined. The zones of water influx may then be closed off by any suitable technique to increase the efficiency of the well production. It will also be apparent that the present apparatus is simple in construction and may be economically manufactured.

Changes may be made in the combination and arrangement of parts or elements heretofore set forth in the specification and show in the drawings without departing from the spirit and scope of the invention as set forth in the following claims.

We claim:

1. In a packer apparatus for isolating zones of an oil well, a housing of a size to be inserted in the well, a pair of axially spaced hydraulically inflatable packers on said housing to engage the walls of the well bore at the upper and lower ends of the zone under study when inflated, a reservoir for hydraulic fluid in said housing, a pump communicating with said packers and said reservoir to force hydraulic fluid into said packers, a power source in said housing for said pump, said housing having a by-pass passageway therein providing communication between said packers and said reservoir around said dump, a valve in said by-pass operatively connected to said power source for closing said by-pass passageway when said power source is energized and opening said by-pass passageway when said power source is de-energized, and means communicating with said packers for imposing a closing pressure differential on said packers when said valve is opened to deflate said packers.

2. Apparatus as defined in claim 1 characterized further in that said means comprises a weighted piston slidingly sealed in said reservoir, with the upper face of said piston exposed to the internal pressure of said packers during deflation, and a passageway extending from said reservoir below said piston to the exterior of said housing for imposing well bore pressure on the lower end of said piston.

3. Apparatus as defined in claim 2 characterized further in that said power source includes an electric motor drivingly connected to said pump, and an on-off controlled supply of electric energy connected to said motor, and a solenoid is interposed in said supply in parallel with said motor and connected to said valve for closing and opening said valve upon operation of said supply.

4. Apparatus as defined in claim 3 characterized further in that a switch is connected in series with said motor and in shunt with said solenoid, a cylinder in said housing communicating at one end with said packers and at its opposite end with well bore pressure, a spring-biased piston in said cylinder forming a barrier between the internal pressure of said packers and the well bore pressure and biased against the internal pressure of said packers, and means interconnecting said spring-biased piston to said switch, whereby said switch is closed when the internal pressure is below a pre-determined minimum and said switch is opened when the internal pressure of said packers is above a pre-determined maximum.

References Cited by the Examiner

UNITED STATES PATENTS

| | | | |
|---|---|---|---|
| 2,352,834 | 7/44 | Hassler | 166—187 X |
| 2,769,498 | 11/56 | Huber | 166—187 |
| 2,812,697 | 11/57 | Laval | 166—187 X |
| 3,066,739 | 12/62 | Saurenman et al. | 166—187 |

BENJAMIN HERSH, *Primary Examiner.*